(12) United States Patent
Dueck

(10) Patent No.: US 6,302,278 B1
(45) Date of Patent: Oct. 16, 2001

(54) BICYCLE DISPLAY RACK

(76) Inventor: Raymond Dueck, Box 700 Arborg, Manitoba (CA), R0C 0A0

( * ) Notice: Subject to any disclaimer, the term of this patent is extended or adjusted under 35 U.S.C. 154(b) by 0 days.

(21) Appl. No.: 09/599,461

(22) Filed: Jun. 22, 2000

(51) Int. Cl.⁷ ...................................................... A47F 5/00
(52) U.S. Cl. .............................. 211/17; 211/117; 211/21; 211/104; 248/324; 248/284.1; 248/292.11
(58) Field of Search .................... 211/113, 117, 211/104, 17, 18, 21; 248/284.1, 324, 292.11, 292.13

(56) References Cited

U.S. PATENT DOCUMENTS

| | | | |
|---|---|---|---|
| 580,032 | * | 4/1897 | Bierbach . |
| 618,394 | * | 1/1899 | Clark . |
| 5,011,239 | * | 4/1991 | Guerin . |
| 5,183,162 | * | 2/1993 | Ritzenthaler ........................ 211/18 X |
| 5,474,189 | * | 12/1995 | Peterson .............................. 211/17 X |
| 5,662,256 | * | 9/1997 | Bryan .................................. 211/18 X |
| 5,664,687 | * | 9/1997 | Liatti ....................................... 211/17 |
| 5,882,099 | * | 3/1999 | Salice . |
| 6,082,552 | * | 7/2000 | Pollock et al. .......................... 211/18 |
| 6,095,344 | * | 8/2000 | White .................................... 211/17 |

* cited by examiner

*Primary Examiner*—Robert W. Gibson, Jr.
(74) *Attorney, Agent, or Firm*—Adrian D. Battison; Michael R. Williams

(57) ABSTRACT

A combination of a bicycle and a display rack therefor, the bicycle has a frame and a plurality of wheels on the frame. The rack having a frame, a mount portion of the frame arranged to be coupled to a ceiling of a building, a linkage having a hanger such that the bicycle can be coupled to the hanger and wherein the linkage is moveable between a first raised position for display and a second lowered position for providing access to the hanger and a cylinder and piston within the mounting portion for retracting the linkage from the second position to the first position.

17 Claims, 5 Drawing Sheets

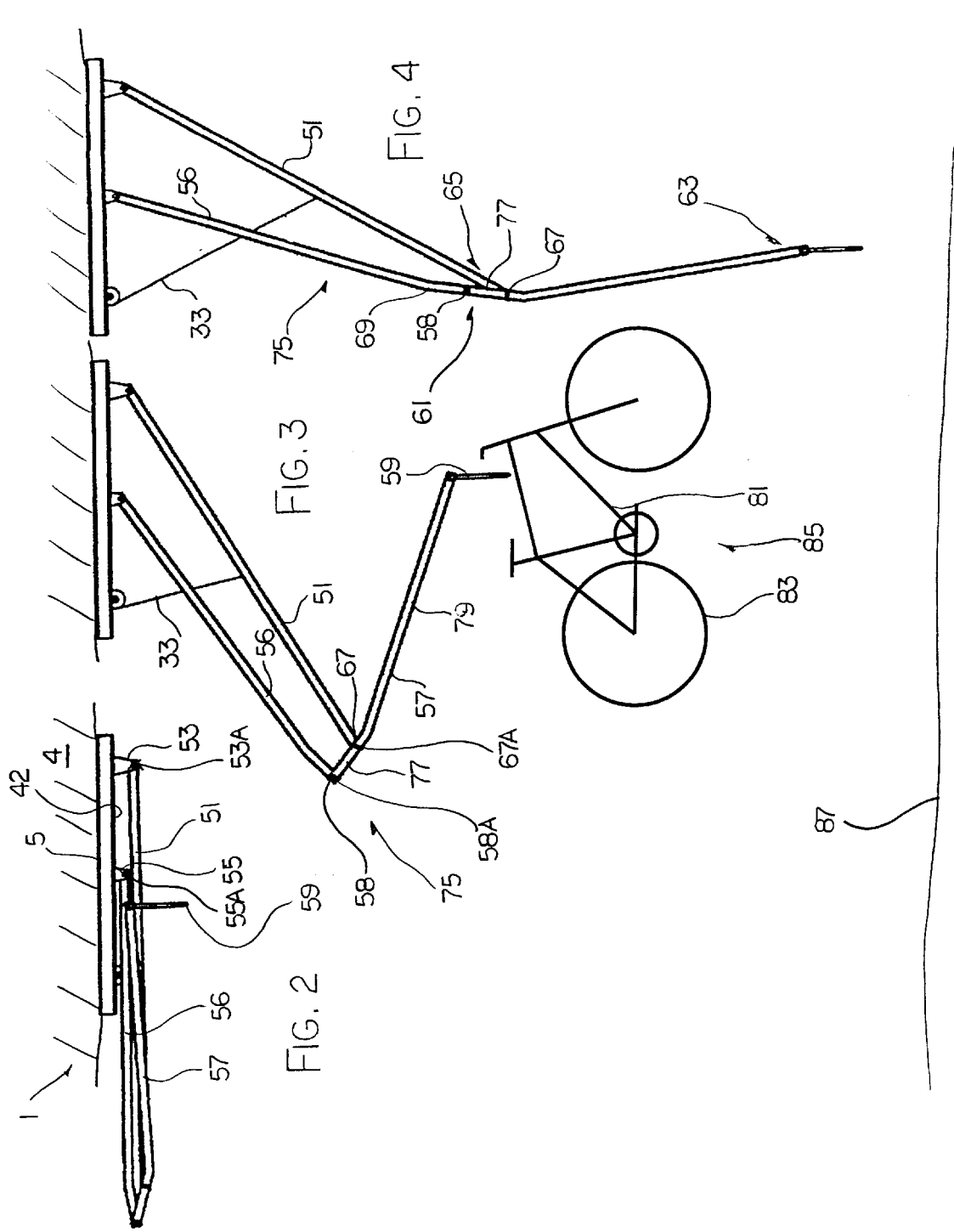

BICYCLE DISPLAY RACK

FIELD OF THE INVENTION

The present invention relates to a bicycle display rack.

BACKGROUND

Commonly, in the retail business, floor space is necessary for providing an acceptable display of item for sale. In order to provide substantial floor space the items must be displayed not only in an attractive orderly manner but they also have to maintain a safe customer environment as well as providing accessibility to the items. A substantially effective way to organize the items is to provide shelving in which the items are placed. Shelving allows the items to be stored and displayed off the floor thereby providing the necessary floor space needed. Placing items on shelves may be found to be unsafe and inefficient since obtaining the items from the shelves could prove to be unsafe and difficult since an employee or such must raise his or her self to the level of the shelf to take down or put up the item(s).

Another way of maximising floor space is to raise the item(s) from the ground and hanging them from racks or hooks. Again the can prove to be difficult and unsafe in that, for the same reasons stated above, the employee has to reach up to the rack or hook to remove or replace the item(s).

Items can also be hung from the ceiling or walls but again could provide an unsafe environment and could prove to be difficult to access the item(s).

In view of the above examples, providing floor space in a retail outlet for bicycles is equally or perhaps more difficult. A first problem which may be caused by bicycles in the outlet is that there is generally a large number of bicycles on display since there are many different models, sizes and types of bicycles available. Also bicycles can be hard to display because bicycles need a stand in order to be in an upright or acceptable displaying position. Putting bicycles on shelves can be proved to be very difficult and unsafe because of the above reasons which provide bicycles with instability.

SUMMARY

According to the present invention there is provided a displaying apparatus comprising,
  a frame;
  a mount portion of the frame arranged to be coupled to a suitable support structure;
  a linkage having a hanger such that articles can be coupled to the hanger and wherein the linkage is moveable between a first position for display and a second position for providing access to the hanger; and,
  a retracting means for retracting the linkage from the second position to the first position.

Accordingly the apparatus is for displaying at least one bicycle such that the bicycle is mounted on the hanger.

Preferably the linkage is a four bar linkage wherein a first and second bar are pivotally coupled to the mount portion such that the bars have a common plane of rotation, the pivot is provided by a first and second hinge respectively.

Preferably a third bar, defining a coupler, is pivotally coupled to outer ends of the first and second bar relative to the first and second hinge by a first and second pivot respectively such that the ends are connected to and spaced apart on the coupler and wherein the hinges are spaced apart on the mount portion.

Preferably the coupler separates the ends of the bars such that a distance between the first and second pivot is less than a distance between the first and second hinge, the coupler has an extending arm in which the hanger is located at a furthermost outer end thereon relative to the coupler.

Conveniently the first hinge extends from the mount portion such that an axis of the first hinge is further away from the mount portion relative to an axis of the second hinge, wherein the axis of the first and second hinge is parallel, wherein the axis of the first and second pivots are parallel and are parallel to the axis of the first and second hinge and wherein the first bar is longer than the second bar.

Preferably the mount portion has a channel which has side walls that extend outwardly from the support structure, a bottom wall at the end of and connecting the side walls such that the channel has an enclosed space located therein and the space is elongate.

Conveniently the hinges are located on an outer side of the bottom wall.

Preferably the retraction means is located within the mount portion.

Preferably the retraction means is a cylinder and piston arrangement, the cylinder is arranged to force the piston outwards.

Preferably the retraction means is a cylinder and piston arrangement, the cylinder is arranged to force the piston outwards wherein movement of the piston is along a length of the channel, wherein an end of the piston is coupled to a guide which guides movement of the piston along and within the channel and wherein the guide has a pulley which rotates about an axis which is transverse to the orientation of the piston.

Conveniently the retraction means has a cable, wherein the cable is anchored to a side wall adjacent the cylinder and wherein the cable extends along one side of the cylinder and wraps around a portion of the pulley and wherein the cable extends along a respective side of the cylinder and then extends out of the channel through the bottom wall.

Conveniently a second pulley is located at a slot in which the cable engages such that the cable is guided by the second pulley out of the channel.

Preferably the cable is anchored to the first bar.

Preferably the cylinder and piston define a gas shock.

Preferably the outward force of the cylinder on the piston forces the cable to rotate the bar about the hinge towards the channel which thereby folds the linkage at the hinges and the pivots adjacent to the mount portion thereby defining the first position.

Preferably movement of the linkage from the first position to the second position lengthens a length of cable from the channel to the first bar and thereby retracts the piston within the cylinder.

Preferably the second position causes extension of the linkage and when fully extended the first and second pivots are over center such that the linkage is supported in the second position.

It is another aspect of the present invention to provide a combination of a bicycle and a display rack therefor, the bicycle comprising:
  a frame and,
  a plurality of wheels on the frame;
  the rack comprising;
  a frame;
  a mount portion of the frame arranged to be coupled to a ceiling of a building;
  a linkage having a hanger such that the bicycle can be coupled to the hanger and wherein the linkage is moveable between a first raised position for display and a second lowered position for providing access to the hanger; and, a retracting means for retracting the linkage from the second position to the first position.

The present invention provides a display for bicycles and the like which provides a safe environment within a retail outlet and provides an employee with accessibility to item(s) on the display.

An advantage of the present invention is that it provides a display which can be raised and lowered providing accessibility to the item(s) on display which thereby provides a safe customer and employee environment along with maximizing floor space within the outlet.

BRIEF DESCRIPTION OF THE DRAWINGS

In the accompanying drawings, which illustrate an exemplary embodiment of the present invention:

FIG. 2 is a side elevational view of the present invention.

FIG. 3 is a side elevational view of the present invention wherein the device is slightly extended.

FIG. 4 is a side elevational view of the present invention wherein the device is fully extended.

DETAILED DESCRIPTION

Figure 1:
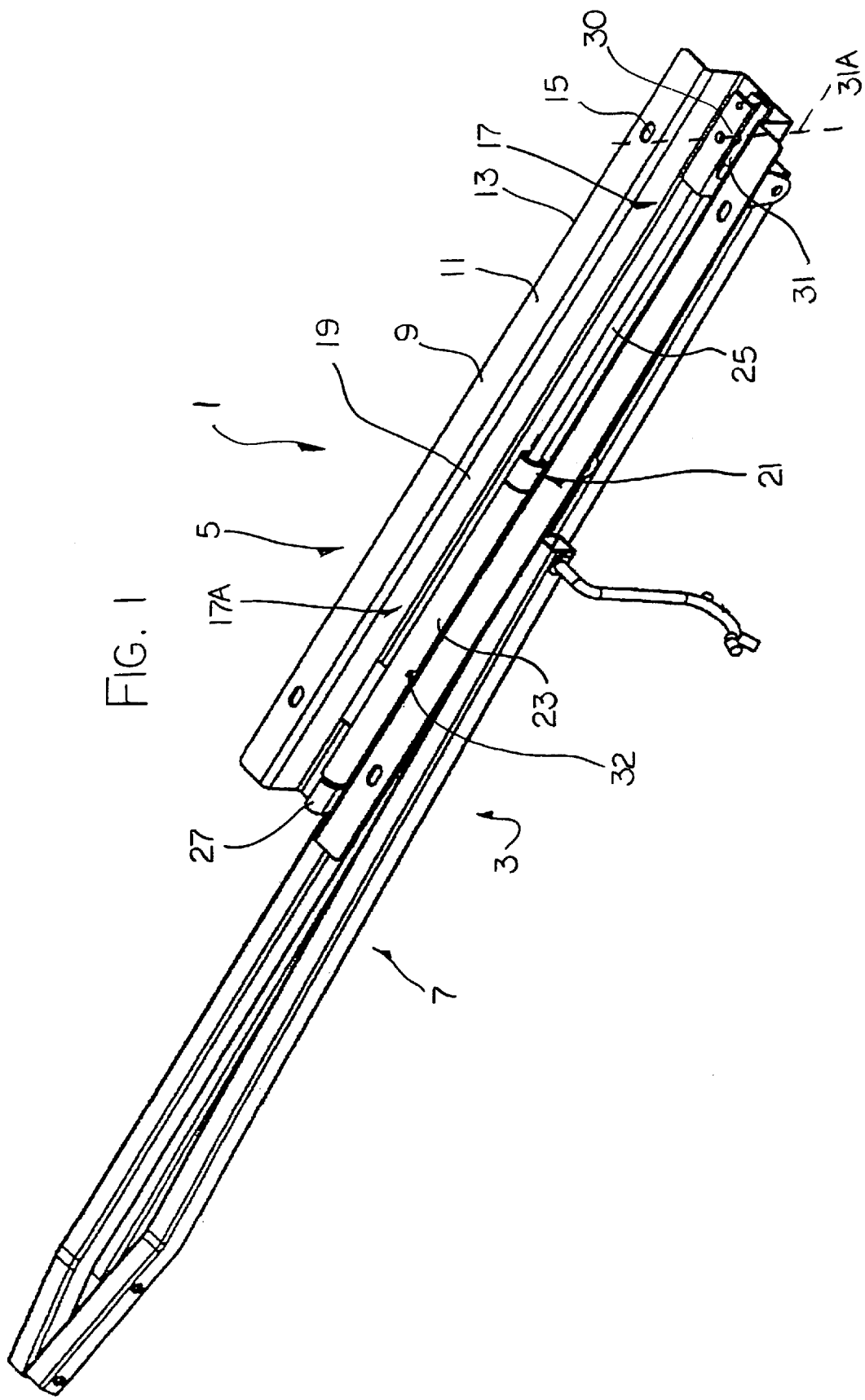
FIG. 1 is an isometric view of the present invention.

Referring to the accompanying drawings, there is illustrated a bicycle display, as generally shown in 1, having a frame 3 which is arranged to be mounted to a suitable support structure 4 at a mounting portion 5. Coupled to and extending from the mounting portion is an arm assembly 7. The arm assembly provides a user with a mechanism for lifting a bicycle of a ground surface 87 such that the bicycle is displayed in a store or the like of the ground. Lifting the bicycle of the ground eliminates the need for using floor space to display bicycles. The display is designed to provide a simple, effective and safe manner of maximizing storage and merchandizing areas by utilizing previously unused space. The display can be used for many different items and is not limited to solely bicycles.

The mounting portion has a top side 9, as best shown in FIG. 1, which has a pair of parallel side flanges 11 having a top flat portion 13 for fastening to the support structure. The flanges has a plurality of holes 15 for receiving a screw or the like for fastening to the support structure. It is sufficient, however, to fasten the mounting portion by clamping to a rail or the like or any suitable means of mounting the display to a supporting surface.

The mounting portion has a channel 17 located between the flanges. The channel has side walls 19 which extended from the flanges such that the channel is located away from the supporting structure. The channel is substantially elongate in that it is longer than it is wide and is sufficiently long and wide enough to provide a space 17A located within the channel for a retracting assembly 21, described below.

The retracting assembly has a cylinder 23 which has a piston 25. The cylinder and piston define a gas shock which is located within the space of the channel and is positioned length wise within the space between the side walls. The cylinder is fastened within the channel by an anchor 27 located at an end of the channel such that the piston can extending fully within the channel. The piston has an end which is coupled to a clevis 30. The clevis provides a guide for the piston and is arranged to slide within the channel with the movement of the piston. The gas shock is arranged such that the cylinder forces the piston outwards.

The clevis supports a pulley 31 which has a vertical axis 31A transverse to the piston and is arranged to move with the clevis within the channel. The pulley is arranged to guide a cable 33. The cable is anchored to a side wall of the channel adjacent the cylinder such that reciprocating movement of the pulley by the piston changes the length of the cable within the channel. The cable runs along a side of the gas shock from an anchor 32 and is guided by a second pulley 37, located on a respective side of the gas shock, which has a substantially horizontal axis 37A and is located within a slot 41. The slot is located on a bottom side 43 of the channel, adjacent the anchor. The second pulley protrudes out the bottom side of the channel though the slot such that the cable extends from the channel. The cable runs in a parallel manner on respective sides of the cylinder.

The clevis has a main body 89 which is square shape in vertical cross section and is substantially rectangular in shape. The main body has a first end 91 which has an insert 93 for receiving the end of the piston. The pulley is located in a slot 95 within the main body of the clevis such that the slot has an open end 97 on an opposite side of the insert. The pulley rotates on a shaft 99 on the axis and is coupled to respective sides of the slot. At the open end of the slot is a roller pin 101 which guides the clevis within the channel. The cable runs along respective sides of the clevis and engages the pulley adjacent the open end.

The arm assembly has three arms which are pivotally connected such that the arms utilise the retraction assembly to raise the arms and enable the arms to be lowered, as described below.

A first arm 51 extends from a bottom surface 42 of the channel. The bottom surface faces away from the support structure. The arm is elongate square rod and is pivotally mounted on the channel, whereby defining a first hinge 53. The hinge has an axis 53A parallel to the axis of the second pulley. The arm thereby can be pivoted on the hinge such that the arm moves along a vertical plane in which the channel is located therein. The first hinge is welded to the bottom surface of the channel adjacent the clevis.

A second arm 56 extends from the channel and is pivotally mounted thereon, similar to the first arm. The pivot, defining a second hinge 55, is similar to the first hinge but is welded to the bottom surface of the channel adjacent the cylinder. The second pivot arm provides the second arm with the same movement as the first arm. The second hinge has a horizontal axis 55A which is parallel with the axis of the first hinge.

The first and second hinges are spaced apart on the channel. The first hinge extends outwards further from the bottom surface than the second hinge, as describe later.

The second arm is pivotally mounted at an opposite end, to the hinge, to a third arm 57, defining a first pivot 58. The second arm is connected to the third arm at a furthermost top end 61 relative to a second furthermost bottom end 63 in which a hanger 59 is located for connecting to a bicycle. The first pivot has an axis 58A which is parallel to the hinges axis.

The first arm has an end 65, opposite the first hinge, which is pivotally connected to the third arm spaced downwards from the first pivot, defining a second pivot 67. The first and second pivot are spaced apart on the third arm, the space there between is less than the space between the first and second hinge on the bottom side of the channel. The space provided between the first pivot and the second pivot is defined as a coupler 77 and the portion of the third arm extending from the second pivot at the coupler is defined as a lever 79. The second pivot has an axis 67A which is parallel to the axis of the first pivot.

Adjacent the second pivot on the third arm is an inward bend 69 such that the third arm is bent slightly to provide a curve on the arm, which will be described further.

The cable is coupled to the first arm at a position between the first hinge and the second pivot and is anchored thereto. The cable is coupled substantially in the middle of the distance between the first hinge and the second pivot.

The positioning, as described above, of the arms provides a four bar linkage 75 wherein each arm is a rigid body with two nodes defining each arm as a binary link. The linkage is a substantially planar mechanism which provides an assemblage of links and joints, interconnected in a way to provide a controlled output motion in response to a supplied input motion. The input motion is provided by the retracting assembly and the output motion is utilised to raise the hanger on the third arm off the ground surface.

As illustrated in FIG. 2, the display is shown in the retracted position. The retracted position is accomplished by the shortening of the cable by the cylinder and piston. The cylinder forces the piston outwards such that a majority of the cable is pulled into the channel shortening the amount of cable extending from the channel which thereby forces the first arm upwards towards the channel. The movement of the first arm pulls the linkage upwards such that the second arm lies substantially parallel and adjacent to the channel and the first arm. The first hinge extends further from the channel so that the first arm can fold substantially on top of the second arm providing substantial space for the hanger on the third arm to be adjacent the channel at the second hinge.

As illustrated in FIG. 3, the third arm can be pulled downwards forcing the length of the cable between the second pulley and the first arm to be lengthened thereby retracting the piston into the cylinder. The linkage is substantially trapezoid in shape. Movement of the linkage causes the third arm to angle downwards such that the lever is lowering thereby lowering the hanger.

Figure 5:
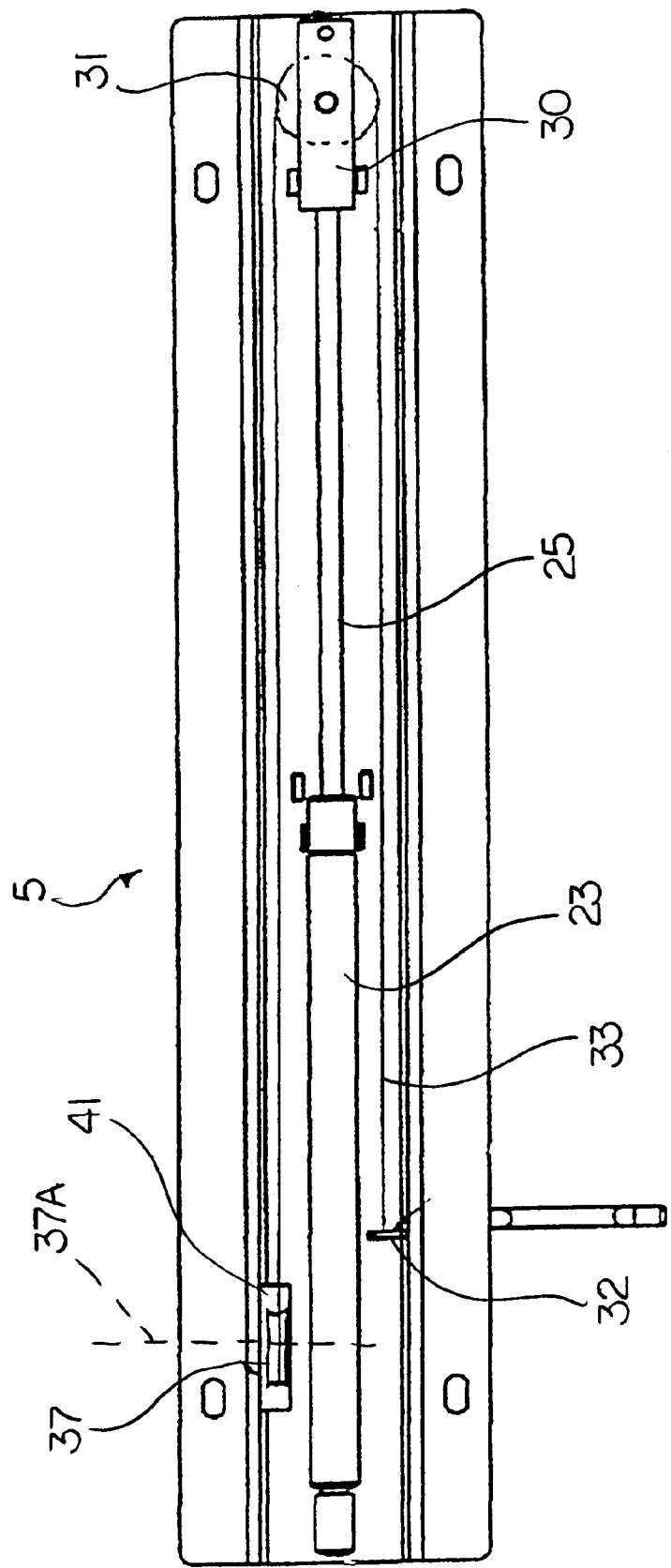
FIG. 5 is a top view of the present invention as shown in FIG. 2.
Figure 6:
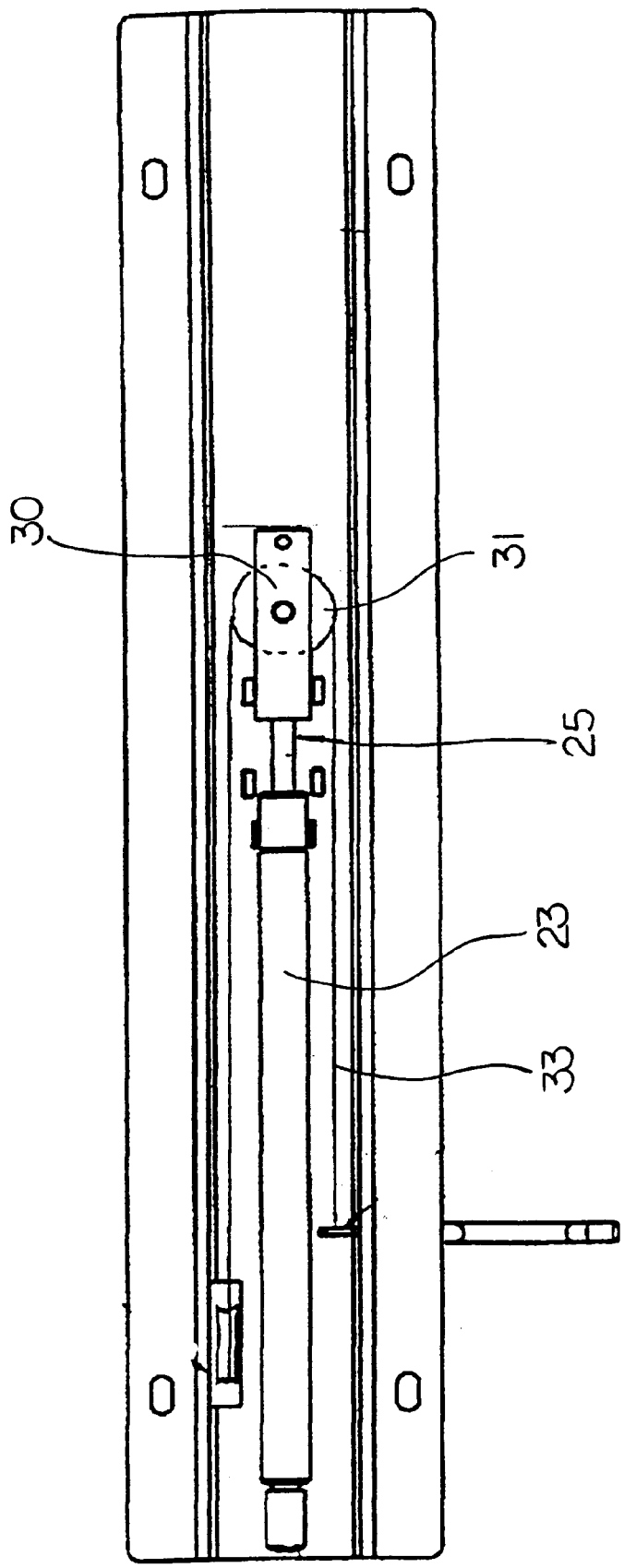
FIG. 6 is a top view of the present invention as shown in FIG. 4.
Figure 7:
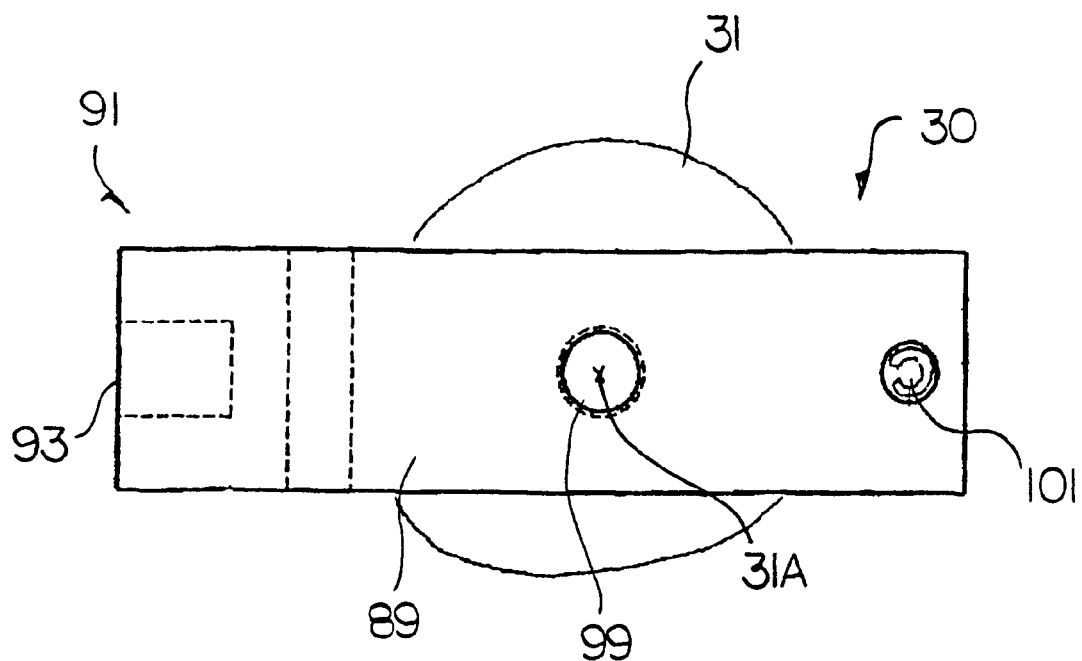
FIG. 7 is a top plan view of the clevis.
Figure 8:
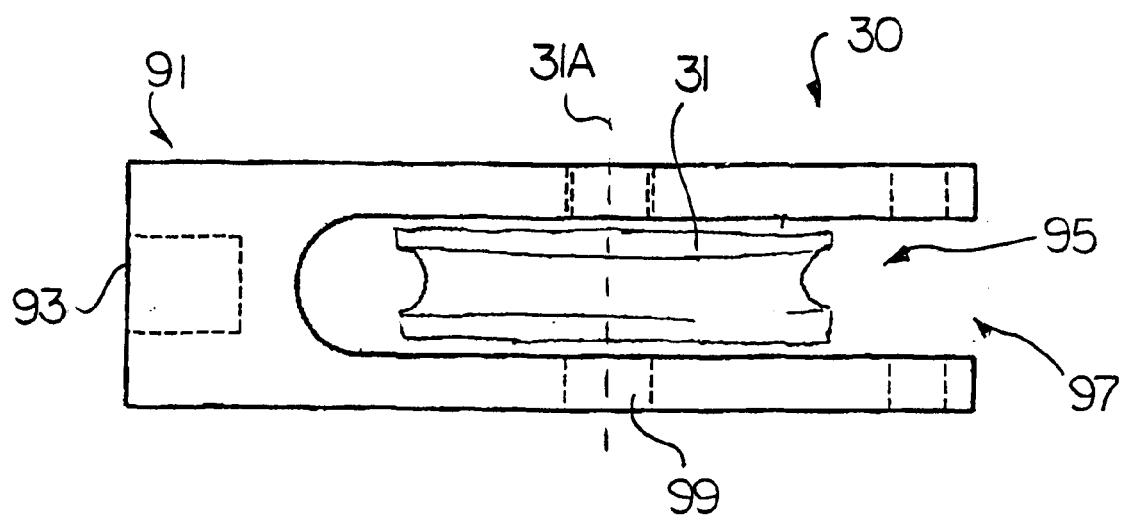
FIG. 8 is a side elevational view of the clevis.

As illustrated in FIGS. 4 and 6, the piston is fully retracted within the cylinder such that the length of the cable between the third arm and the second pulley is maximized. In the fully extended position the first pivot is located in an over center position relative to the second pivot. The over centre effect provides the linkage with a locked position such that the a user can mount a bicycle 85 onto the hanger, when the bicycle is mounted on the hanger the user lifts the arm in opposite direction and the pivots are then released from the over center position allowing the cylinder to force the piston outwards. As the piston if forced outwards the length between the second pulley and the first arm is shortened such that the linkage retracts to the position as shown in FIGS. 3 and 5.

In an alternate embodiment, there is more than one hanger on the display such that a user can add more bicycles.

The bicycle is connected to the hanger at a frame 81, or the wheel 83 or any suitable location on the bicycle.

While one embodiment of the present invention has been described in the foregoing, it is to be understood that other embodiments are possible within the scope of the invention. The invention is to be considered limited solely by the scope of the appended claims.

What is claimed:

1. A displaying apparatus comprising:
    a frame;
    a mount portion of the frame arranged to be coupled to a suitable support structure;
    a linkage having a hanger such that articles can be coupled to the hanger and wherein the linkage is moveable between a first position for display and a second position for providing access to the hanger; and,
    a retracting means for retracting the linkage from the second position to the first position;
    wherein the linkage is a four bar linkage with the bars lying in a common plane, wherein a first and a second bar are pivotally coupled to the mount portion at a first and second hinge respectively.

2. The apparatus according to claim 1 wherein a third bar, defining a coupler, is pivotally coupled to outer ends of the first and second bar relative to the first and second hinge by a first and second pivot respectively such that the ends are connected to and spaced apart on the coupler and wherein the hinges are spaced apart on the mount portion.

3. The apparatus according to claim 2 wherein the coupler separates the ends of the bars such that a distance between the first and second pivot is less than a distance between the first and second hinge, the coupler has an extending arm in which the hanger is located at a furthermost outer end thereon relative to the coupler.

4. The apparatus according to any one of claim 3 wherein the first hinge extends from the mount portion such that an axis of the first hinge is further away from the mount portion relative to an axis of the second hinge, wherein the axis of the first and second hinge is parallel, wherein the axis of the first and second pivots are parallel and are parallel to the axis of the first and second hinge and wherein the first bar is longer than the second bar.

5. The apparatus according to claim 1 wherein the mount portion has a channel which has side walls that extend outwardly from the support structure, a bottom wall at the end of and connecting the side walls such that the channel has an enclosed space located therein and the space is elongate and the retraction means is located within the mount portion.

6. The apparatus according to claim 1 wherein the retraction means is a cylinder and piston arrangement, the cylinder is arranged to force the piston outwards.

7. The apparatus according to claim 5 wherein the retraction means is a cylinder and piston arrangement, the cylinder is arranged to force the piston outwards wherein movement of the piston is along a length of the channel, wherein an end of the piston is coupled to a guide which guides movement of the piston along and within the channel and wherein the guide has a pulley which rotates about an axis which is transverse to the orientation of the piston.

8. The apparatus according to claim 7 wherein the retraction means has a cable, wherein the cable is anchored to a side wall adjacent the cylinder and wherein the cable extends along one side of the cylinder and wraps around a portion of the pulley and wherein the cable extends along a respective side of the cylinder and then extends out of the channel through the bottom wall.

9. The apparatus according to claim 8 wherein a second pulley is located at a slot in which the cable engages such that the cable is guided by the second pulley out of the channel.

10. The apparatus according to claim 8 wherein the outward force of the cylinder on the piston forces the cable to rotate the bar about the hinge towards the channel which thereby folds the linkage at the hinges and the pivots adjacent to the mount portion thereby defining the first position.

11. The apparatus according to claim 8 wherein movement of the linkage from the first position to the second position lengthens a length of cable from the channel to the first bar and thereby retracts the piston within the cylinder.

12. The apparatus according to claim 2 wherein the second position causes extension of the linkage and when fully extended the first and second pivots are over center such that the linkage is supported in the second position.

13. A combination of a bicycle and a display rack therefor, the bicycle comprising:
a frame; and,
a plurality of wheels on the frame;
the rack comprising;
a frame;
a mount portion of the frame arranged to be coupled to a ceiling of a building;
a linkage having a hanger such that the bicycle can be coupled to the hanger and wherein the linkage is moveable between a first raised position for display and a second lowered position for providing access to the hanger; and,
a retracting means for retracting the linkage from the second position to the first position;
wherein the linkage is a four bar linkage with the bars lying in a common plane, wherein a first and a second bar are pivotally coupled to the mount portion at a first and second hinge respectively;
wherein the mount portion has a channel which has side walls that extend outwardly from the support structure, a bottom wall at the end of and connecting the side walls such that the channel has an enclosed space located therein and the space is elongate;
wherein the retraction means is a cylinder and piston arrangement, the cylinder is arranged to force the piston outwards wherein movement of the piston is along a length of the channel, wherein an end of the piston is coupled to a guide which guides movement of the piston along and within the channel and wherein the guide has a pulley which rotates about an axis which is transverse to the orientation of the piston;
wherein a cable wraps around a portion of the pulley and is connected to the linkage.

14. A displaying apparatus comprising.
a frame;
a mount portion of the frame arranged to be coupled to a suitable support structure;
a linkage having a hanger such that articles can be coupled to the hanger and wherein the linkage is moveable between a first position for display and a second position for providing access to the hanger; and,
a retracting means for retracting the linkage from the second position to the first position;
wherein the mount portion has a channel which has side walls that extend outwardly from the support structure, a bottom wall at the end of and connecting the side walls such that the channel has an enclosed space located therein and the space is elongate;
wherein the retraction means is a cylinder and piston arrangement, the cylinder is arranged to force the piston outwards wherein movement of the piston is along a length of the channel, wherein an end of the piston is coupled to a guide which guides movement of the piston along and within the channel and wherein the guide has a pulley which rotates about an axis which is transverse to the orientation of the piston;
wherein a cable wraps around a portion of the pulley and is connected to the linkage.

15. The apparatus according to claim 14 wherein the linkage is a four bar linkage wherein a first and second bar are pivotally coupled to the mount portion such that the bars have a common plane of rotation, the pivot is provided by a first and second hinge respectively.

16. The apparatus according to claim 14 wherein the cable is anchored to a side wall adjacent the cylinder and wherein the cable extends along one side of the cylinder and wraps around a portion of the pulley and wherein the cable extends along a respective side of the cylinder and then extends out of the channel through the bottom wall.

17. The apparatus according to claim 16 wherein a second pulley is located at a slot in which the cable engages such that the cable is guided by the second pulley out of the channel.

\* \* \* \* \*